United States Patent [19]

Bulle

[11] 4,440,005
[45] Apr. 3, 1984

[54] TRAILER HITCH RING LOCK

[76] Inventor: Marshall Bulle, R.R. 1, P.O. Box 98, Farmington, Minn. 55024

[21] Appl. No.: 386,243

[22] Filed: Jun. 8, 1982

[51] Int. Cl.³ .................... B60R 25/00; E05B 27/36
[52] U.S. Cl. .......................................... 70/14; 70/34
[58] Field of Search ................... 70/14, 19, 57, 58, 32, 70/33, 34, 258; 280/507

[56] References Cited

U.S. PATENT DOCUMENTS

| | | | |
|---|---|---|---|
| 1,797,710 | 3/1931 | Blackmore | 70/19 |
| 1,971,797 | 8/1934 | Shinn | 70/19 |
| 2,500,375 | 3/1950 | Parker | 70/58 |
| 3,844,143 | 10/1974 | Hudson | 70/14 |
| 4,186,575 | 2/1980 | Bulle | 70/14 |

FOREIGN PATENT DOCUMENTS 1290330  9/1972  United Kingdom ................... 70/19

*Primary Examiner*—Robert L. Wolfe

[57] ABSTRACT

Two generally flat, circular plates, one having an attached threaded male cylindrical shaped extension and the other an attached mating threaded female cylindrical shaped extension are threaded together through the ring of a trailer hitch tongue until the plates are in contact with the ring and held locked in threaded engagement by a latch to prevent the unauthorized use of the trailer. The latch is spring loaded and is extended through an opening in the side of the male cylinder to engage any one of a number of internal grooves coaxial with the cylinder, cut in the female cylinder, to provide the locking function. A single lobe cam contained within the male cylinder is mounted on the end of a conventional lock cylinder which, in turn, is rotated by a matching key. Rotated to a first position by the key, the cam will permit the spring to urge the latch through the side opening in the male cylinder to engage the grooves in the female cylinder and provide the locking action and in a second position the cam will withdraw the latch into the male cylinder to permit either threading the two extensions together prior to locking, or to permit the removal of the lock after use.

7 Claims, 4 Drawing Figures

TRAILER HITCH RING LOCK

BACKGROUND OF THE INVENTION

I. Field of the Invention

This invention relates generally to locking mechanisms and relates particularly to an apparatus which is locked within the eye of a trailer tongue to prevent the unauthorized movement of the trailer.

II. Description of the Prior Art

There are a number of locks made to secure one item within another to prevent unauthorized use or unauthorized access using a cylinder having tumblers operated by a key. This structure is revealed in U.S. Pat. Nos. Feller, 2,742,726; Kruschwitz, 2,791,976, and Jacobi, 1,982,831.

In U.S. Pat. No. Hudson, 3,884,143, a pintle hook locking device for an eye of a trailer tongue is revealed. This lock requires a separate adjustment for pintle size and provides no protection for the lock cylinder or for forced removal.

In my U.S. Pat. No. 4,196,575, the device provided locking with automatic sizing for a number of ring sizes and continued positive locking even upon the lock cylinder removal.

My present device provides all of these functions in a greatly improved and simplified lock with a consequent reduction in both number of parts and cost of manufacture. The elimination of parts permits the threading members used to attach the two lock parts to be greatly increased in diameter with a corresponding increase in strength. The latching means in this device moves perpendicular to their receptacle as compared to the rotation of the latching means in my previous device which now requires that the entire end of the latch be sheared off to permit removal of the lock without a key.

SUMMARY OF THE INVENTION

A lock apparatus made up of two threaded mating parts which are secured together through the ring of a trailer to prevent its unauthorized use. The two parts comprise threaded mating first male and female cylinders attached to essentially flat circular plates which are larger than the outside of the ring. The female cylinder has a number of coaxial full length grooves about the interior periphery which extend completely through the threads. The male cylinder is hollow and has a pair of perpendicular radial slots, in the end opposite the plate, which are aligned with each other. A spring-loaded latch is slideably mounted within these slots and is urged toward the outside of the cylinder by a spring which bears against a projection on the latch. The latch is held in place within the slots of the cylinder by a press fit washer in the end of the male cylinder. A single lobed cam, mounted coaxial with the cylinder which is affixed to a conventional lock cylinder, bears against the cam-follower projection on the latch. The cam and cam follower are such that when the lock cylinder and cam are rotated by means of a matching key to a first position, the latch will be forced fully within the male cylinder by the cam, but when the cam is rotated to a second position by the key operating the lock cylinder the cam will permit the spring to urge one end of the latch out of the cylinder through one of the slots. The two parts are locked together through the ring by inserting the key into the lock cylinder and rotating the cylinder to the first position to force the latch fully within the male cylinder. The parts are then secured together through the ring by engaging and tightening the threads on the two parts until the plates abut the ring. The key, lock cylinder and cam are then rotated to the second position to permit the spring to urge the latch toward the outside of the male cylinder into one of the grooves in the female cylinder thereby locking the two parts in place. The key is then removed to complete the locking process. To remove the lock, the key is reinserted in the lock cylinder and used to rotate the lock cylinder and cam to the first position, which withdraws the latch fully within the male cylinder. The two parts can then be unthreaded, one from the other, to complete the unlocking process.

DESCRIPTION OF THE PREFERRED EMBODIMENT

Figure 1:
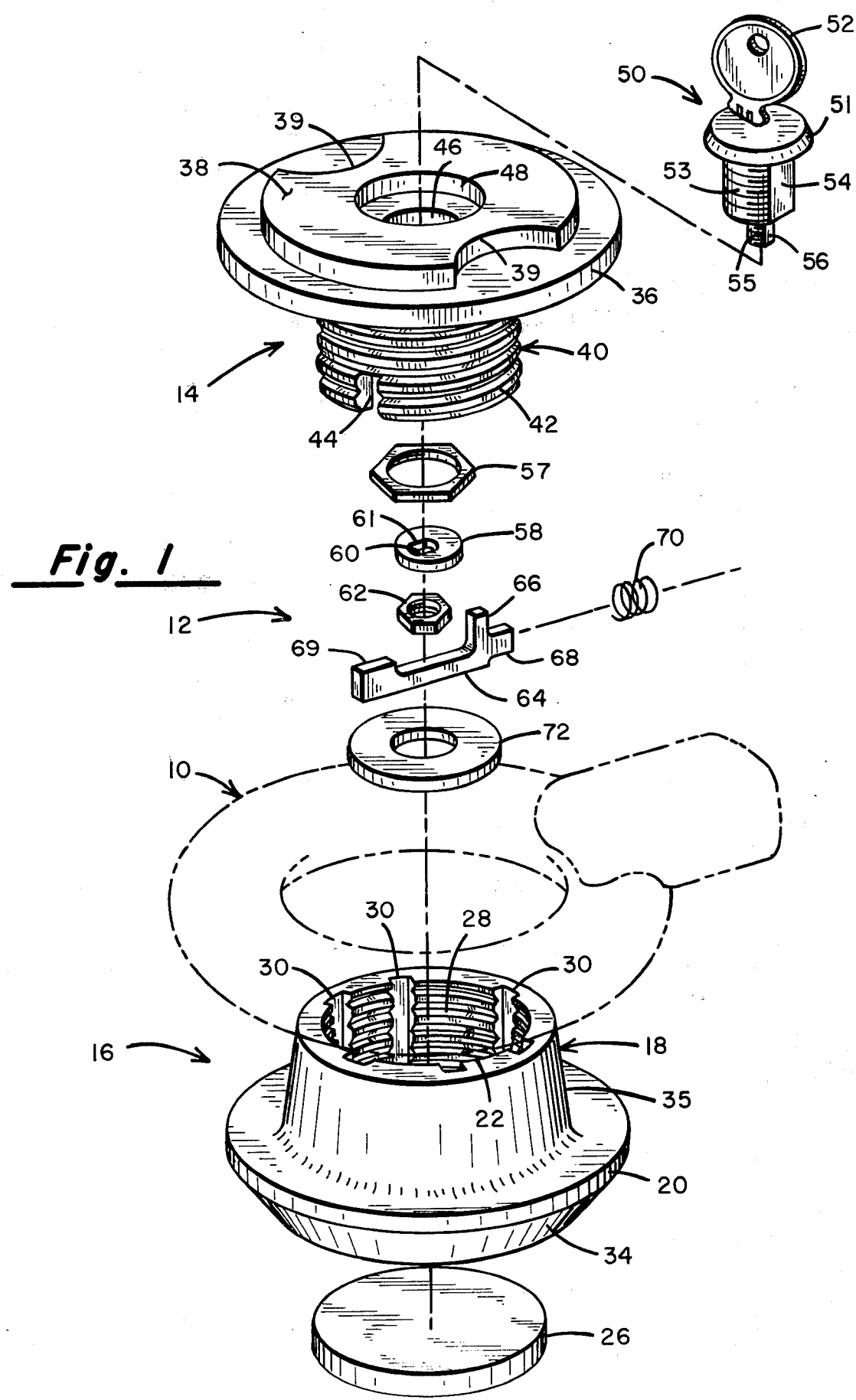
FIG. 1 is an exploded isometric view of the individual parts of the invention oriented for attachment through a ring shown in phantom outline.

All descriptions as to location, orientation and rotation are given in respect to the various drawings. Referring to FIG. 1, a trailer vehicle (not shown) has a towing attachment with an eye 10 used to engage a pintle (not shown) of a towing vehicle. The opening of eye 10 is necessary to make an attachment to the trailer and blocking this opening makes the unauthorized moving of the trailer vehicle essentially impossible. The preferred embodiment of the trailer hitch ring lock, generally described as 12, is used to close this opening to prevent any unauthorized use of the trailer.

Lock 12 is made up generally of an upper male part 14 and a lower female part 16 which thread together to seal the opening in eye 10. Female part 16 is generally a receptacle, a cylinder 18 with an integral circular bottom plate 20. A center hole 22 extends completely through cylinder 18 and through plate 20 to a centered circular recess 24, which is larger than hole 22 and is shown in cross-section in FIGS. 2 and 3. Recess 24 is formed in the lower part of plate 20, and has a proper diameter and depth to accept a cover 26, which is held in place by a weld with filets 27.

Figure 3:
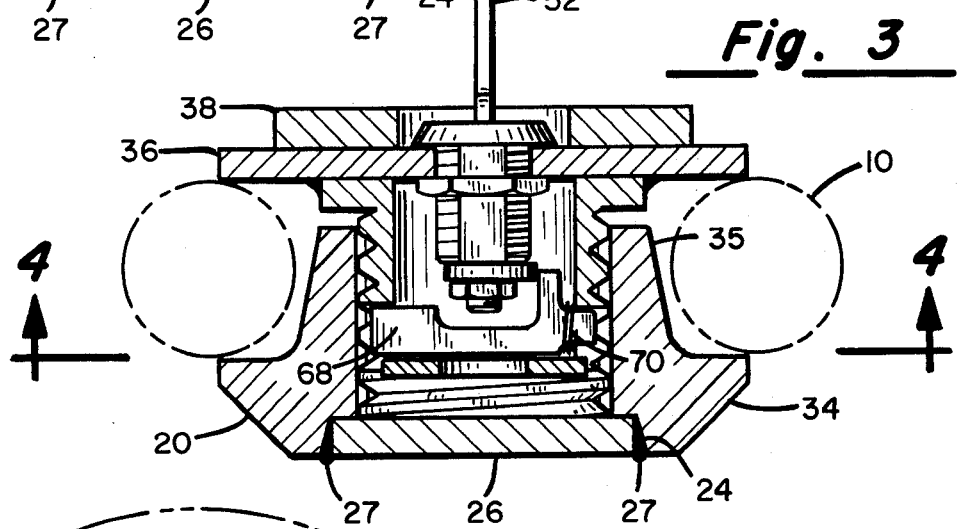
FIG. 3 is the same view as FIG. 2 with the latch free.
Figure 4:
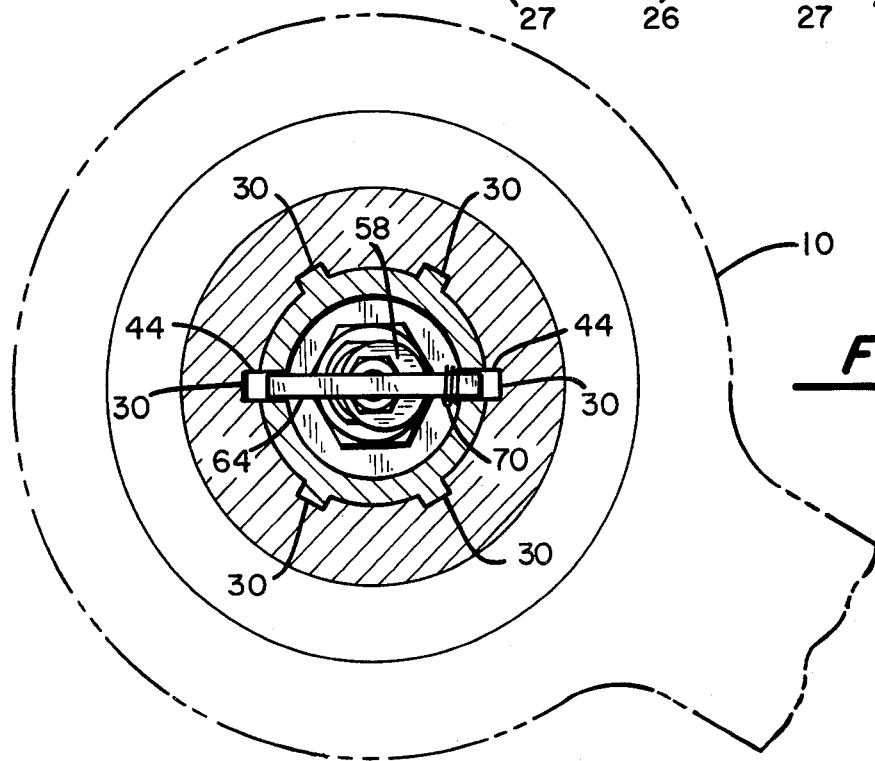
FIG. 4 is a cross-section view of FIG. 3 taken along line 4—4.

Threads 28, shown in FIG. 1, are formed the full length of hole 22. Six equal width radial grooves 30 are formed the full length of hole 22, coaxial with the hole, extending completely through threads 28 as shown in FIGS. 1 and 4. Plate 20 has a tapered side 34 and cylinder 18 has a tapered side 35, shown in FIGS. 1, 2 and 3, the purpose of which will be discussed later. As shown in FIG. 1, the major parts of male part 14 consist of an upper plate 36, having a lock guard 38 attached to its upper surface, and a hollow extension, cylinder 40, welded to its lower portion. Cylinder 40 has a centered hole 41 its full length and a full length exterior thread 42, also shown in FIGS. 2 and 3. Cylinder 40 and thread 42 are of the proper size and shape to mate with cylinder 18 and thread 28. Cylinder 40 has a pair of opposing radial slots 44, one of which is shown in FIG. 1, through opposing side walls at its bottom extremity which extend a portion of the distance to plate 36.

Plate 36 has a generally circular hole 46 with opposing flat faces, not shown, located in its center, the purpose of which will be explained later, and lock guard 38 has a slightly larger circular hole 48 located in its center. Guard 38 has two opposing circular shaped cut-outs 39 in its outer periphery, the purpose of which will be explained later. A lock cylinder 50 has a matching key 52. Lock cylinder 50 has a flange 51 and a threaded mounting extension 53 with two opposing flat faces 54, one of which is shown in FIG. 1, which extension and faces mate with hole 46. With lock cylinder 50 mounted in place extension 53 fits within hole 46 and flange 51 fits within hole 48. Lock cylinder 50 is prevented from rotating with respect to plate 36 because of the opposing flat surfaces on hole 46 and extension 53. Extension 53 is held in place within hole 46 by a nut 57. Lock cylinder 50 has an inner threaded extension 55 which is the portion of the lock cylinder rotated by key 52 and this extension has two opposing flat faces 56, one of which is shown in FIG. 1.

Figure 2:
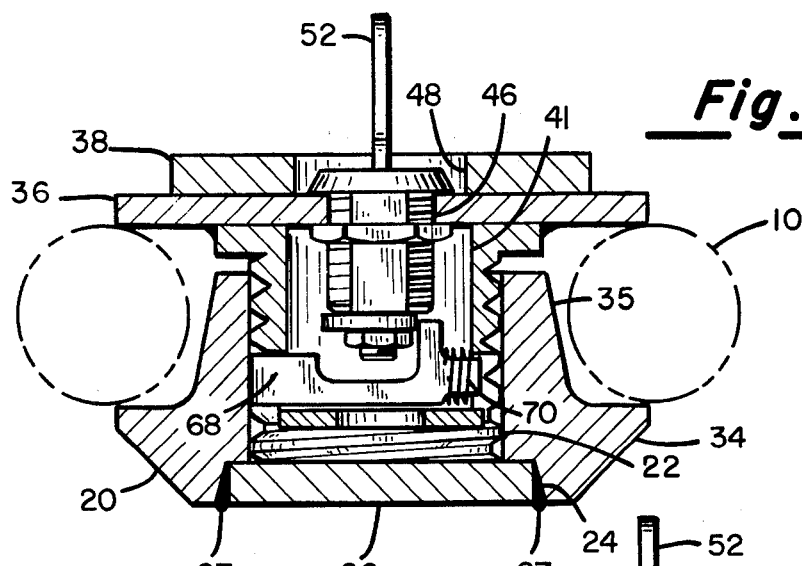
FIG. 2 is a cross-section view of the device attached to the ring shown with the latch engaged.

A single lobed cam 58 is achieved by using a circular shaped metal plate with a slightly offset hole 60. Hole 60 is generally circular but has two flat sides 61 which are sized to fit about lock cylinder extension 55. The flat sides 56 of extension 55 matching the flat sides 61 of hole 60 prevents cam 58 from rotating with respect to the extension. Cam 58 is held in place on extension 55 by a nut 62 which matches the threads on the extension. A latch 64 has a vertical extension 66 and two horizontal extensions 68 and 69, with extension 69 being slightly longer than extension 68. Extension 66 acts as a cam follower and is held against cam 58 by a spring 70 which is mounted around extension 68 and bears against vertical extension 66 and the inner wall of cylinder 40. Latch 64 is mounted within cylinder 40 with horizontal extensions 68 and 69 within opposing slots 44 and is held in place by a washer 72 which is held within cylinder 40 by means of a press fit. The dimensions of cylinder 40, slots 44, latch 64 and cam 58 are such that when the cam is rotated by key 52, acting through lock cylinder extension 55 such that the maximum distance is obtained between hole 60 and extension 66, as shown in FIGS. 3 and 4, cam follower 66 is forced rightward by the cam which forces latch 64 rightward and forces extension 69 fully within its respective slot 44. Conversely, when cam 58 is rotated one hundred and eighty degrees by key 52 such that the minimum distance is obtained between hole 60 and extension 66, as shown in FIG. 2, then the cam permits extension 66 and latch 64 to be forced leftward by spring 70 such that extension 69 can extend beyond the roots of thread 28 into one of the grooves 30 in cylinder 18 which grooves are made the proper width to admit extension 69. The male portion 14 of lock 12 cannot be rotated with respect to female portion 16, with extension 69 extended into one of the grooves 30, thus providing the lock function. Extension 68 is made shorter than 69 such that it does not extend beyond cylinder 40 with latch 64 in the rightmost position, as shown in FIG. 3.

To attach lock 12 to ring 10 key 52 is rotated to rotate extension 55 and cam 58, until cam follower 66 is forced to its maximum distance from hole 60 which, in turn, retracts extension 69 within its respective slot 44 as shown in FIGS. 3 and 4. Circular cut-outs 39 in lock guard 38 provide a convenient finger grip for this process. Parts 14 and 16 are then oriented as shown in FIG. 1 on opposite sides of eye 10 and the two parts are threaded together through the eye by engaging threads 28 and threads 42 and rotating one part with respect to the other until plates 20 and 36 touch ring 10. Tapered sides 35 of cylinder 18 permit lock 12 to be used with a number of different sized rings 10. Key 52 is then rotated one hundred and eighty degrees to rotate extension 55 and cam 58, until extension 66 is the minimum distance from hole 60 as shown in FIG. 2, which permits spring 70 to urge latch 64 leftward.

Key 52 is then removed from cylinder 50. If one of the grooves 30 within cylinder 18 is opposite latch 64 as shown in FIG. 2, then spring 70 will urge latch 64 into this groove which locks the rotation between the male portion 14 of the lock and female portion 16 of the lock. However, if one of the grooves 30 is not opposite latch 64 then whenever male portion 14 is rotated with respect to female portion 16 when one of the grooves 30 of cylinder 18 is rotated opposite the latch, spring 70 can then force extension 69 into the groove thereby completing the locking process as is shown in FIG. 2. Therefore, even though latch 64 may not have engaged one of the grooves 30 when key 52 is removed and the locking cycle apparently complete an attempt by anyone to separate the lock by rotating portion 14 with respect to portion 16 will automatically complete the locking process after a rotation between the portions of not more than sixty degrees which rotation will not permit the lock portions to be separated. A user familiar with the lock would probably take this last step himself, but even if it were omitted the security of the lock would not be compromised.

To remove lock 12, key 52 is reinserted into cylinder 50 and used to rotate cam 58 one hundred and eighty degrees until extension 66 is forced the maximum distance from hole 60 which again retracts extension 69 within its respective slot 44, as shown in FIGS. 3 and 4, and then male portion 14 is unthreaded from female portion 16 to remove the lock.

All parts of the lock, where any force can be exerted, are made of steel for maximum strength. The larger diameter of cylinders 18 and 40 permitted by this approach are strong and allow using extremely heavy coarse threads 28 and 42 which prevent forcing the lock portions 14 and 16 readily apart. Lock guard 38 protects lock cylinder 50 from direct blows and tapered side 34 reduces the purchase of any tool used in an attempt to force the rotation of the two lock parts. Latch 69 is moved horizontally into grooves 30 and therefore the entire end of horizontal extension 69 must be broken off in order to force a rotation between lock portions 14 and 16.

All parts can be made very thick and strong. The simplicity of operation and the minimum number of parts greatly reduces the cost of manufacture and the possibility of any operational failure of this lock. The design is such that even if lock cylinder 50 were removed by force latch 64 would still be forced into one of the grooves 30 by spring 70.

This lock provides an improved, simplified, rugged locking action which is simple to attach, adjusts to a large number of ring sizes by merely rotating one part relative to the other, and which is extremely difficult to remove by any force. Taper 35 in the side wall of cylinder 18 also provides a portion of this automatic size adjustment by providing a closure for a number of sizes of ring openings.

Although specific construction of the herein disclosed lock has been shown and described, it is obvious that those skilled in the art may make various modifications and changes to them without departing from the scope and spirit of the present invention. It is to be expressly understood that the instant invention is limited only by the appended claims.

What is claimed is:

1. For use with a trailer type vehicle having a generally toroidal shaped coupling hook locking apparatus for inhibiting the unauthorized use of said trailer comprising
   (a) a first plate having an aperture therethrough and a tubular cylinder projecting from a first side surface thereof, said tubular cylinder being threaded over a predetermined portion thereof and having a pair of opposing open slots formed through the side walls thereof extending a predetermined distance from the end of said cylinder opposite said plate towards said plate;
   (b) a generally elongated latch member slideably mounted within said slots;
   (c) a key operated lock assembly secured in said aperture and having a cam member affixed thereto for rotation when a key is inserted in said lock and turned, said cam member cooperating with said latch member for extending at least a portion of said latch member out of one of said slots of said cylinder; and
   (d) a second plate having a tubular cylinder projecting from a first side, said cylinder having internal threads along a portion thereof of the proper size and shape that they may be engaged with the threads of said threaded tubular cylinder projecting from said first plate, said tubular cylinder projecting from said second plate having at least one longitudinal groove formed within said cylinder, said groove having a depth greater than said threads therein, the arrangement being such that when the key operated lock is in a first condition, said threaded portion of said cylinder projecting from said first plate may be engaged with the threaded portion of said cylinder projecting from said second plate, by rotating said first plate relative to said second plate, but when said key operated lock is in a second condition, said latch will extend outward from said cylinder of said first plate through one of said slots in said cylinder, and into said longitudinal groove formed in the interior wall of said cylinder projecting from said second plate to prevent relative rotation of said first and second plates.

2. The device as in claim 1 wherein the outer diameter of said cylinder projecting from said second plate is dimensioned to fit through the aperture of said toroidal coupling hook and said first and second plates are sized to completely block said aperture of said coupling hook, when the threaded portions of said cylinders are engaged.

3. The device as in claim 1 and further including:
   (a) said latch member having projections along its major axis, a longer first projection and a shorter second projection, and a third projection adjacent to and perpendicular to said second projection,
   (b) a coil spring mounted about said second latch projection such that the spring bears against the interior of said first cylinder mounted on said second plate and the said third projection to force said third projection against said cam, said third projection acting as a cam follower.

4. Apparatus as in claim 1 wherein said second plate is circular and its periphery is tapered.

5. Apparatus as in claim 1 wherein said second cylinder periphery is tapered.

6. Apparatus as in claim 1 and further including:
   (a) a reinforcing plate having an aperture formed centrally therein and affixed to the second side of said first plate, said aperture in said reinforcing plate providing access to the key hole in said key operated lock; and
   (b) first and second arcuate recesses formed inwardly from the side edges of said reinforcing plate to provide finger gripping zones for facilitating the rotational engagement of said threaded portions of said cylinder projecting from said first plate and said cylinder projecting from said second plate.

7. Apparatus as in claim 1 having a circular recess formed in the center of a second side of said second plate, said recess having a cover affixed therewithin.

* * * * *